(12) United States Patent
Tosaka et al.

(10) Patent No.: US 10,933,562 B2
(45) Date of Patent: Mar. 2, 2021

(54) METHOD FOR PRODUCING FRP PRECURSOR AND DEVICE FOR PRODUCING SAME

(71) Applicant: HITACHI CHEMICAL COMPANY, LTD., Tokyo (JP)

(72) Inventors: Yuji Tosaka, Chikusei (JP); Yoshinori Satoh, Hitachi (JP); Takeshi Saitoh, Sakuragawa (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 477 days.

(21) Appl. No.: 15/570,998

(22) PCT Filed: Apr. 27, 2016

(86) PCT No.: PCT/JP2016/063263
§ 371 (c)(1),
(2) Date: Oct. 31, 2017

(87) PCT Pub. No.: WO2016/178399
PCT Pub. Date: Nov. 10, 2016

(65) Prior Publication Data
US 2018/0345540 A1   Dec. 6, 2018

(30) Foreign Application Priority Data

May 1, 2015   (JP) .............................. JP2015-094376

(51) Int. Cl.
*B29B 11/16* (2006.01)
*C08J 5/24* (2006.01)
(Continued)

(52) U.S. Cl.
CPC .............. *B29B 11/16* (2013.01); *B29B 11/04* (2013.01); *B29B 11/12* (2013.01); *B29B 13/02* (2013.01);
(Continued)

(58) Field of Classification Search
CPC .............................. B29C 70/50; B29C 70/504
See application file for complete search history.

(56) References Cited

U.S. PATENT DOCUMENTS

| | | |
|---|---|---|
| 5,330,595 A | 7/1994 | Held |
| 2009/0126974 A1 | 5/2009 | Yuasa et al. |
| 2014/0299253 A1 | 10/2014 | Minamida et al. |

FOREIGN PATENT DOCUMENTS

| | | |
|---|---|---|
| CN | 103660308 A | 3/2014 |
| CN | 204282016 U | 4/2015 |

(Continued)

OTHER PUBLICATIONS

Zhu et al., Principles of Composites, National Defense, Industry Press, Jul. 2013, pp. 139-140 (an office action in counterpart CN Appln. No. 201680022798.7 dated Apr. 26, 2019).

(Continued)

*Primary Examiner* — Benjamin A Schiffman
(74) *Attorney, Agent, or Firm* — Fitch, Even, Tabin & Flannery, LLP (57) ABSTRACT

Provided are a method for producing an FRP precursor and a device for producing an FRP precursor, wherein the method and the device have a good productivity, and under a normal pressure, enable filling of a resin into a bulk gap of an aggregate as well as prevent the resin from spouting out from an edge portion thereof. The method for producing the FRP precursor is to produce the FRP precursor by melt-adhering each of a pair of thermosetting resin films 54 to each of both surfaces 40a and 40b of an aggregate 40 that is in a form of a sheet, the method comprising: an aggregate's surface heating process to heat aggregate's both surfaces, i.e., the both aggregate's surfaces 40a and 40b of the aggregate 40, and a film press-adhering process to obtain the FRP precursor wherein under a normal pressure, one aggregate-side film surface 54a of the pair of the films 54 is (Continued)

press-adhered to one surface of the heated both aggregate's surfaces, and another aggregate-side film surface 54a of the pair of the films 54 is press-adhered to another surface of the heated both aggregate's surfaces.

10 Claims, 1 Drawing Sheet

(51) Int. Cl.
*C08J 5/04* (2006.01)
*B29B 13/02* (2006.01)
*B29B 15/12* (2006.01)
*B29B 11/04* (2006.01)
*B29B 11/12* (2006.01)
*B29D 7/01* (2006.01)
*B29K 101/10* (2006.01)
*B29L 31/34* (2006.01)

(52) U.S. Cl.
CPC ............... *B29B 15/12* (2013.01); *B29D 7/01* (2013.01); *C08J 5/043* (2013.01); *C08J 5/24* (2013.01); *B29K 2101/10* (2013.01); *B29L 2031/3425* (2013.01); *C08J 2363/00* (2013.01); *C08J 2363/04* (2013.01)

(56) References Cited

FOREIGN PATENT DOCUMENTS

| | | |
|---|---|---|
| JP | S58-078724 A | 5/1983 |
| JP | H01-272416 A | 10/1989 |
| JP | H04-219213 A | 8/1992 |
| JP | H11-114953 A | 4/1999 |
| JP | 2011-132389 A | 7/2011 |
| JP | 2011-132535 A | 7/2011 |
| JP | 2013-108058 A | 6/2013 |
| WO | 2013/014893 A1 | 1/2013 |

OTHER PUBLICATIONS

International Search Report for PCT/JP2016/063263 dated Jul. 12, 2016; English translation submitted herewith (6 pages).

METHOD FOR PRODUCING FRP PRECURSOR AND DEVICE FOR PRODUCING SAME

CROSS-REFERENCE TO RELATED APPLICATIONS

This application is a U.S. national phase application filed under 35 U.S.C. § 371 of International Application No. PCT/JP2016/063263, filed Apr. 27, 2016, designating the United States, which claims benefit of the filing date of JP 2015-094376, filed May 1, 2015, which is hereby incorporated herein by reference in its entirety.

TECHNICAL FIELD

The present invention relates to an FRP precursor and a device for producing the same.

BACKGROUND ART

FRP (Fiber Reinforced Plastics) is a composite material using an aggregate with a high modulus, such as fibers, wherein the aggregate is incorporated into a mother material (matrix) such as a plastic material in order to enhance the strength thereof. Therefore, FRP is a composite material which is cheap, light, and excellent in durability because this utilizes its weatherability, lightness, and resistances to heat and chemicals.

By utilizing these characteristics, FRP is used in a wide field. For example, because FRP can be molded and has high strength, it is used as structural materials of housing equipment, marine vessels, vehicles, airplanes, etc. In addition, because of its electric non-conductance, FRP is used also in electric devices as well as in the field of electronic parts such as a printed circuit board.

Illustrative example of the FRP production method includes an RTM (Resin Transfer Molding) method wherein a resin is charged into a matched mold having an aggregate spread therein, a Hand Lay-up (HLU) method or a spray-up method wherein with defoaming a resin the resin is laminated in a multiple fashion onto a spread aggregate, and an SMC (Sheet Molding Compound) press method wherein an aggregate and a resin are pre-mixed and made to a form of a sheet, and then this is press-molded in a mold.

When FRP is used for a printed circuit board, the thickness of FRP for the printed circuit board is required to be thinner than the thickness of the FRP for other uses. In addition, the FRP for the printed circuit board is required to have a high quality specification, such as absence of a void and a narrow acceptable range of variance in its thickness after FRP molding.

Accordingly, many FRPs for the printed circuit board are produced by the Hand Lay-up (HLU) method. The Hand Lay-up method is the production method wherein a varnish having a resin dissolved therein is applied to an aggregate by using a coating machine, which is then followed by drying it so as to remove a solvent and cure it by heating (PTL 1). In the Hand Lay-up method, if a thermosetting resin is applied to the aggregate in advance, the workability in the process can be improved and the load to a surrounding environment can be lowered.

However, when an aggregate such as an aramid unwoven cloth without a calendar treatment, a thin glass paper, and a thin woven clothe is used, they are low in the strength as the aggregate; and thus, upon applying the varnish followed by solvent removal, drying, and thermal curing, the weight thereof outweighs the allowable load of the aggregate, resulting in a poor workability such as a cut of the aggregate and a breakage of the aggregate upon narrowing a gap of the coater so as to control the amount of the resin to be applied.

In addition, the FRP for a printed circuit board needs to satisfy both a high accuracy of the thickness after lamination and a filling property (moldability) of the resin into an inner layer circuit pattern. Therefore, it is necessary to produce the FRP precursors having different amounts of the resin attached to the aggregate with the difference of several percentages by mass, or the FRP precursors having different curing times of the thermosetting resin, or the FRP precursors obtained from combination of them, or the like, so that plural FRP precursors need to be produced from one aggregate; and thus, the process thereof is cumbersome. Moreover, because each of these FRP precursors is produced by different coating condition, loss of the material used in the production thereof is significant.

Accordingly, there is a method for producing the FRP precursor wherein the thermosetting resin is not applied directly to the aggregate, but the thermosetting resin is previously made to a resin film in a form of a film and then the said resin film and the aggregate are heated and pressed so as to be adhered (PTL 2).

In this method, however, because the resin is filled into a bulk gap of the aggregate, when the adhesion is conducted under vacuum, response to a trouble and efficiency in workability and the like are not so good. On the other hand, when the adhesion is conducted in an atmosphere, filling of the resin into the aggregate is poor, which can cause a void therein. In order to enhance the filling property, if the resin's viscosity is lowered by raising a lamination temperature, or if a pressure to be applied is increased so as to enhance the filling property into the aggregate, the resin spouts out from an edge portion thereof or the thickness of the resin varies in the plane thereof, so that it is difficult to obtain a good product.

Accordingly, a method is proposed wherein heating and pressing are conducted from the central portion so as to pushing out an air successively (PTL 3). In this method, however, the heating condition is different between the central portion and the edge portion, so that the curing degree of the thermosetting resin becomes different in the plane. In addition, because the roll-lamination treatment is carried out more than once, the production equipment needs to be provided with many heating and pressing rolls.

Moreover, in the above-mentioned production method, the resin's viscosity is lowered by heating. In this method, however, a heat source is a heating and pressing roll so that the surface of the resin to be impregnated into the aggregate is the farthest from the heat source. In addition, when the heating and pressing roll is contacted with the aggregate, a heat of the heating and pressing roll is taken away by the aggregate thereby causing to lowering of the resin temperature, resulting in an increase in the viscosity thereof; and thus, it can cause significant deterioration of the resin's fluidity (impregnability).

CITATION LIST

Patent Literature

PTL 1: Japanese Patent Laid-Open Publication No. H01-272416
PTL 2: Japanese Patent Laid-Open Publication No. 2011-132535
PTL 3: Japanese Patent Laid-Open Publication No. H11-114953

SUMMARY OF INVENTION

Technical Problem

The problem of the present invention is to provide a method for producing an FRP precursor and a device for producing an FRP precursor, wherein the method and the device have a good productivity, and under a normal pressure, enable filling of a resin into a bulk gap of an aggregate as well as prevent the resin from spouting out from an edge portion thereof.

Solution to Problem

Inventors of the present invention carried out an extensive investigation, and as a result, they found that in an atmosphere (normal pressure) where a good workability is prevailing, when a thermosetting resin film is heated from its adhering side to an aggregate or an aggregate is heated in advance, a method for producing an FRP precursor and a device for producing an FRP precursor can be provided, wherein the method and the device have a good productivity, and enable filling of the resin into a bulk gap of the aggregate as well as prevent the resin from spouting out from an edge portion thereof. Namely, the present invention is as follows.

[1] A method for producing an FRP precursor, wherein the method is to produce the FRP precursor by melt-adhering a thermosetting resin film to one surface of an aggregate that is in a form of sheet, the method comprising:

an aggregate's surface heating process to heat one surface of the aggregate, and a film press-adhering process to obtain the FRP precursor wherein under a normal pressure, of both surfaces of the film, an aggregate-side film surface, which is a surface in an aggregate side thereof, is press-adhered to an aggregate's surface, which is one surface of the heated aggregate.

[2] The method for producing the FRP precursor according to [1], wherein the film press-adhering process is a process to press-adhere the film to the aggregate with heating the film and the aggregate, and a heating temperature of one surface of the aggregate in the aggregate's surface heating process is higher than a heating temperature in the film press-adhering process by 5 to 70° C.

[3] The method for producing the FRP precursor according to [1] or [2], wherein the method further comprises a preliminary film heating process to heat the aggregate-side film surface by radiation from a side of the aggregate-side film surface.

[4] The method for producing the FRP precursor according to [3], wherein the film press-adhering process is a process to press-adhere the film to the aggregate with heating the film and the aggregate, and a heating temperature of the aggregate-side film surface in the preliminary film heating process is higher than a heating temperature in the film press-adhering process by 5 to 70° C.

[5] The method for producing the FRP precursor according to any one of [1] to [4], wherein the film press-adhering process is conducted in the range of minus 40° C. to plus 20° C. relative to a minimum melt viscosity temperature of the thermosetting resin film.

[6] A method for producing an FRP precursor, wherein the method is to produce the FRP precursor by melt-adhering each of a pair of thermosetting resin films to each of both surfaces of an aggregate that is in a form of a sheet, the method comprising:

an aggregate's surface heating process to heat both aggregate's surfaces, which are both surfaces of the aggregate, and a film press-adhering process to obtain the FRP precursor wherein under a normal pressure, of both surfaces of one film of the pair of the films, one aggregate-side film surface, which is a surface in an aggregate side thereof, is press-adhered to one surface of the heated both aggregate's surfaces, and of both surfaces of another film of the pair of the films, an another aggregate-side film surface, which is a surface in an aggregate side thereof, is press-adhered to another surface of the heated both aggregate's surfaces.

[7] The method for producing the FRP precursor according to [6], wherein the film press-adhering process is a process to press-adhere the pair of the films and the aggregate with heating the pair of the films and the aggregate, and a heating temperature of both surfaces of the aggregate in the aggregate's surface heating process is higher than a heating temperature in the film press-adhering process by 5 to 70° C.

[8] The method for producing the FRP precursor according to [7], wherein the method further comprises a preliminary film heating process to heat one aggregate-side film surface by radiation from a side of the one aggregate-side film surface, and to heat another aggregate-side film surface by radiation from a side of the another aggregate-side film surface.

[9] The method for producing the FRP precursor according to [8], wherein the film press-adhering process is a process to press-adhere the pair of the films to the aggregate with heating the films and the aggregate, and each of heating temperatures of the one aggregate-side film surface and the another aggregate-side film surface in the preliminary film heating process is higher than a heating temperature in the film press-adhering process by 5 to 70° C.

[10] The method for producing the FRP precursor according to any one of [6] to [9], wherein the film press-adhering process is conducted in the range of minus 40° C. to plus 20° C. relative to a minimum melt viscosity temperature of the thermosetting resin film.

[11] A device for producing an FRP precursor, wherein the device is used in the method for producing the FRP precursor according to any one of [1] to [5], the device comprising:

an aggregate's surface heating means to heat one surface of the aggregate, and a film press-adhering means to obtain the FRP precursor wherein under a normal pressure, of both surfaces of the film, an aggregate-side film surface, which is a surface in an aggregate side thereof, is press-adhered to an aggregate's surface, which is one surface of the heated aggregate.

[12] A device for producing an FRP precursor, wherein the device is used in the method for producing the FRP precursor according to any one of [6] to [10], the device comprising:

an aggregate's surface heating means to heat both aggregate's surfaces, which are both surfaces of the aggregate, and a film press-adhering means to obtain the FRP precursor wherein under a normal pressure, of both surfaces of one film of the pair of the films, one aggregate-side film surface, which is a surface in an aggregate side thereof, is press-adhered to one of the heated both aggregate's surfaces, and of both surfaces of another film of the pair of the films, an another aggregate-side film surface, which is a surface in an aggregate side thereof, is press-adhered to another surface of the heated both aggregate's surfaces.

Advantageous Effects of Invention

According to the present invention, the method for producing the FRP precursor and the device for producing the FRP precursor can be provided, wherein the method and the device have a good productivity, and under a normal pressure, enable filling of a resin into a bulk gap of an aggregate as well as prevent the resin from spouting out from an edge portion thereof.

DESCRIPTION OF EMBODIMENTS

Figure 1:
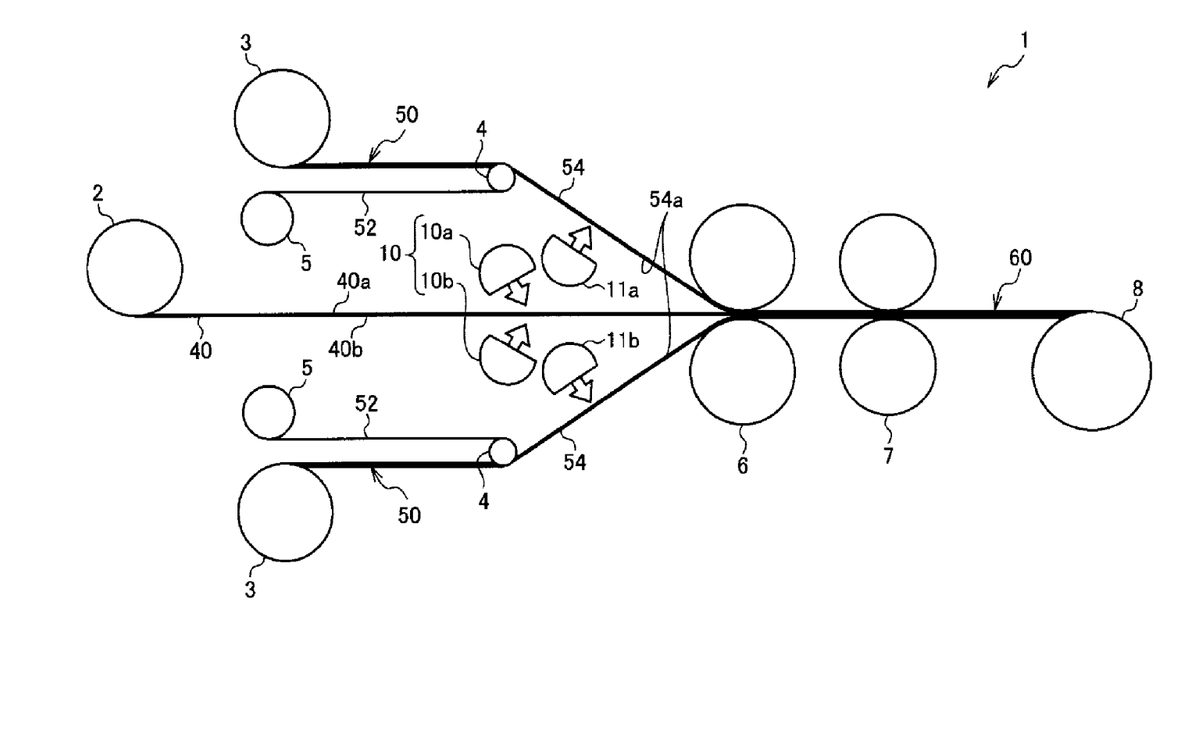
FIG. 1 is a conceptual diagram of the method for producing the FRP precursor and the device for producing the FRP precursor according to the present invention.

With referring to FIG. 1, explanation will be made with regard to embodiments of the FRP precursor production method and the FRP precursor production device 1 according to the present invention. Meanwhile, the FRP precursor production device 1 will be explained as the device to melt-adhere each of a pair of resin films (thermosetting resin films) 54 to both surfaces of an aggregate 40 in a form of a sheet; however, the device may also be the one in which one resin film 54 is melt-adhered to only one surface of the aggregate 40 in a form of a sheet. In this case, one resin film send-out device 3, one protection film peel-off mechanism 4, one protection film roll-up device 5, one heating body 10a (or 10b), and one resin film heating device 11a (or 11b), which are disposed in a lower side (or in a upper side) of the aggregate 40 in FIG. 1, are not necessary.

The FRP precursor production device 1 is placed under a normal pressure. The FRP precursor production method according to the present invention can be conducted by the FRP precursor production device 1.

The FRP precursor production device 1 is provided with an aggregate send-out device 2, a pair of the resin film send-out devices 3 and 3, an aggregate heating device 10, a sheet heating-and-pressing device 6, and an FRP precursor roll-up device 8. Preferably, the FRP precursor production device 1 is further provided with a sheet pressing-and-cooling device 7, a pair of the resin film heating devices 11a and 11b, a pair of the protection film peel-off mechanisms 4 and 4, and a pair of the protection film roll-up devices 5 and 5.

The aggregate send-out device 2 is the device wherein a roll to which the aggregate 40 in a form of a sheet is rolled up is rotated to a direction opposite to a roll-up direction thereby sending out the aggregate 40 that is rolled up in a roll. In FIG. 1, the aggregate send-out device 2 sends out the aggregate 40 from a lower side of the roller toward the sheet heating-and-pressing device 6.

Each of the pair of the resin film send-out devices 3 and 3 has a roll to which a protection-film-attached resin film 50 is rolled up and a supporting mechanism to rotatably support the roll with imparting a prescribed tension to the protection-film-attached resin film 50 that is sent out from the roll, wherein the roll to which the protection-film-attached resin film 50 is rolled up is rotated to a direction opposite to a roll-up direction thereof so as to send out the protection-film-attached resin film 50 that is rolled up to the roll. As described later, the protection-film-attached resin film 50 is a film in a form of a sheet including a resin film 54 and a protection film 52 that is laminated to an aggregate-side film surface (of both surfaces of the resin film 54, the surface in the side of the aggregate 40) 54a, which is one surface of the resin film 54.

Each of the pair of the resin film send-out devices 3 and 3 is located in a side of a front surface 40a and a side of a back surface 40b of the sent-out aggregate 40, respectively.

The one resin film send-out device 3 is located in the side of the front surface 40a of the sent-out aggregate 40, wherein the one protection-film-attached resin film 50 is sent out from the lower side of the roller to the one protection film peel-off mechanism 4 in such a way that the protection film 52 may be in the side of the sent-out aggregate 40.

In the same way, the other resin film send-out device 3 is located in the side of the back surface 40b of the sent-out aggregate 40, wherein the other protection-film-attached resin film 50 is sent out from the upper side of the roller to the other protection film peel-off mechanism 4 in such a way that the protection film 52 may be in the side of the sent-out aggregate 40.

The pair of the protection film peel-off mechanisms 4 and 4 are conversion rollers, each of which is located in the side of the front surface 40a and the side of the back surface 40b of the sent-out aggregate 40, respectively.

The one protection film peel-off mechanism 4 receives, onto the surface of the rotating conversion roller, the protection-film-attached resin film 50 which is sent out from the one resin film send-out device 3 toward the one protection film peel-off mechanism 4, wherein the one resin film 54 of the one protection-film-attached resin film 50 is made to progress toward the sheet heating-and-pressing device 6, while the one protection film 52 is made to progress toward the one protection film roll-up device 5, so that the one protection film 52 is peeled off from the one protection-film-attached resin film 50. In this way, the aggregate-side film surface 54a of the one resin film 54 is exposed.

In the same way, the other protection film peel-off mechanism 4 receives, onto the surface of the rotating conversion roller, the protection-film-attached resin film 50 which is sent out from the other resin film send-out device 3 toward the other protection film peel-off mechanism 4, wherein the other resin film 54 of the other protection-film-attached resin film 50 is made to progress toward the sheet heating-and-pressing device 6, while the other protection film 52 is made to progress toward the other protection film roll-up device 5, so that the other protection film 52 is peeled off from the other protection-film-attached resin film 50. In this way, the aggregate-side film surface 54a of the other resin film 54 is exposed.

Each of the pair of the protection film roll-up devices 5 and 5 is located in the side of the front surface 40a and the side of the back surface 40b of the sent-out aggregate 40, respectively, and rolls up the protection films 52 and 52 that are peeled off by the pair of the protection film peel-off mechanisms 4 and 4.

The aggregate heating device 10 has the heating body 10a and the heating body 10b which are located in the side of the front surface 40a and the side of the back surface 40b of the sent-out aggregate 40, respectively. The heating body 10a is a radiation-based heating body to heat the front surface 40a of the aggregate 40 under a normal pressure, and the heating body 10b is a radiation-based heating body to heat the back surface 40b of the aggregate 40 under a normal pressure.

Meanwhile, the aggregate may be heated with various ways such as radiation, contact, and convection, though the later-mentioned heating method of the resin film is preferable in view of convenience. In order to avoid natural cooling, with calculating the line velocity, the heating position thereof is preferably within 20 seconds, while more preferably within 5 seconds, before the heating and compression roller.

Each of the heating temperatures of the front surface 40a and the back surface 40b of the aggregate 40 in the aggregate's surface heating process is higher than the heating temperature in the subsequent film press-adhering process preferably by 5 to 70° C., more preferably by 7 to 60° C., while preferably by 10 to 50° C.

The resin film heating device 11a is located between the front surface 40a of the sent-out aggregate 40 and the aggregate-side film surface 54a of the one resin film 54 so as to heat the aggregate-side film surface 54a of the sent-out one resin film 54.

The resin film heating device 11b is located between the back surface 40b of the sent-out aggregate 40 and the aggregate-side film surface 54a of the other resin film 54 so as to heat the aggregate-side film surface 54a of the sent-out other resin film 54.

The pair of the resin film heating devices 11a and 11b are the heating bodies to heat, under a normal pressure, the aggregate-side film surfaces 54a of the one resin film 54 and of the other resin film 54, respectively. The heating bodies are, for example, radiation-based heating bodies.

The radiation-based heating body, an infrared beam, and a visible light including an infrared beam are convenient and easy in actual use. With these heating bodies, such troubles as deformation of the resin surface due to flutter of the film and stickiness of the surface can be suppressed. In order to suppress natural cooling, with calculating the line velocity, the heating position thereof is preferably within 20 seconds, while more preferably within 5 seconds, before the heating and pressing roll. The heating temperature thereof as the resin's surface temperature is preferably in the range of minus 20° C. to plus 30° C. relative to a minimum melt viscosity temperature obtained by measurement of a thermosetting resin composition by means of a rheometer.

The heating temperatures of both the aggregate-side film surfaces 54a and 54a of the pair of the resin films 54 and 54 in the preliminary film heating process are higher than the heating temperature in the subsequent film press-adhering process preferably by 5 to 70° C., more preferably by 7 to 60° C., while preferably by 10 to 50° C.

The sheet heating-and-pressing device 6 has a pair of heating and compression rollers and a compression-force-imparting mechanism (not shown in the drawing) to impart a compression force to the pair of the heating and compression rollers. The pair of the heating and compression rollers have heating bodies inside thereof so as to heat with a prescribed set temperature.

The sheet heating-and-pressing device 6 forms a FRP precursor 60 in a form of a sheet by press-adhering the resin films 54 and 54 to the aggregate 40 that is entered thereto by means of the rotating pair of the heating and compression rollers (film press-adhering process) while sending-out the FRP precursor 60 toward the sheet pressing-and-cooling device 7. Specifically, the aggregate 40 which is sent out from the aggregate send-out device 2 and the resin films 54 and 54 which are sent out from the pair of the protection film peel-off mechanisms 4 and 4, respectively, enter into between the pair of the heating and compression rollers in such a way that the front surface 40a and the back surface 40b of the aggregate 40 which is sent out from the aggregate send-out device 2 may be laminated to each of the resin films 54 and 54 which is sent out from the pair of the protection film peel-off mechanisms 4 and 4, respectively.

At this time, the one resin film 54 is laminated to the aggregate 40 in such a way that the side of the aggregate-side film surface 54a of the one resin film 54 may be adhered to the side of the front surface 40a of the aggregate 40, and the other resin film 54 is laminated to the aggregate 40 in such a way that the side of the aggregate-side film surface 54a of the other resin film 54 may be adhered to the side of the back surface 40b of the aggregate 40; in this way, the FRP precursor 60 is formed. The FRP precursor 60 that is sent out from the sheet heating-and-pressing device 6 is in a high temperature state.

The sheet pressing-and-cooling device 7 has a pair of the cooling and compression rollers and a compression-force-imparting mechanism (not shown in the drawing) to impart a compression force to the pair of the cooling and compression rollers. The pair of the cooling and compression rollers compress and cool the FRP precursor 60 in the high temperature state, which is sent out from the sheet heating-and-pressing device 6, by the pair of the rotating, cooling and compression rollers, and then send out this FRP precursor to the FRP precursor roll-up device 8.

The FRP precursor roll-up device 8 has a roll to roll up the FRP precursor 60 in a form of a sheet which is sent out from the sheet pressing-and-cooling device 7, as well as a driving mechanism to rotate the roll (not shown in the drawing).

Meanwhile, because the FRP precursor production device 1 uses a so-called roller lamination method, it is preferable that the heating temperatures of the aggregate 40 and the resin film 54 are higher in a central portion and lower in an edge portion in a width direction. In the roller lamination method, a pressure is applied to the roller's edge portion and a linear pressure is applied to the entirety thereof by making use of the roller's rigidity, resulting in subtle deformation to a bow shape. Accordingly, if the viscosity is the same, deformation to the bow shape is facilitated; and thus, the viscosity in a central portion of the resin film 54 is made lower and the viscosity in the edge portion thereof is made higher so as to generate a fluidity difference between the central portion and the edge portion in order to suppress deformation to the bow shape.

If the heating temperature is made different in a width direction, the melted resin is cured differently in a width direction; and thus, it is preferable to control the distances of the central portion and the edge portion to the roller by disposing the heating body in the V-shape so as to cause different temperatures while giving the same heat amount during the time of the roller lamination. In addition, it is preferable to cool the FRP precursor after the roller lamination by the cooling and compression roller so as to remove unnecessary heat and to flatten the product.

The FRP precursor production device 1 described above is operated in the way as described below.

Firstly, the aggregate 40 in a form of a sheet is sent out from the aggregate send-out device 2 toward the sheet heating-and-pressing device 6. At this time, both the front surface 40a and the back surface 40b of the aggregate 40 are exposed.

Next, under a normal pressure, each of the front surface 40a and the back surface 40b of the aggregate 40 is heated with the heating bodies 10a and 10b of the aggregate heating device 10, respectively (aggregate's surface heating process).

On the other hand, the one protection-film-attached resin film 50 is sent out from the lower side of the roller of the one resin film send-out device 3 toward the one protection film peel-off mechanism 4 in such a way that the protection film 52 may be in the side of the sent-out aggregate 40. The other protection-film-attached resin film 50 is sent out from the upper side of the roller of the other resin film send-out device 3 toward the other protection film peel-off mechanism 4 in such a way that the protection film 52 may be in the side of the sent-out aggregate 40.

Next, when the one protection-film-attached resin film 50 that is sent out changes the direction thereof upon reaching the conversion roller, i.e., the one protection film peel-off mechanism 4, the one protection film 52 is peeled off from the one protection-film-attached resin film 50 in such a way that the aggregate-side film surface 54a may be exposed, whereby the one resin film 54 is progressed toward the sheet heating-and-pressing device 6. In this way, the aggregate-side film surface 54a of the one resin film 54 is exposed. In the same way, when the other protection-film-attached resin film 50 that is sent out changes the direction thereof upon reaching the conversion roller, i.e., the other protection film peel-off mechanism 4, the other protection film 52 is peeled off from the other protection-film-attached resin film 50 in such a way that the aggregate-side film surface 54a may be exposed, whereby the other resin film 54 is progressed toward the sheet heating-and-pressing device 6. In this way, the aggregate-side film surface 54a of the other resin film 54 is exposed.

Each of the pair of the protection films 52 and 52 that are peeled off is rolled up by the pair of the protection film roll-up devices 5 and 5, respectively.

Before the one and the other resin films 54 and 54 whose aggregate-side film surfaces 54a are exposed reach the sheet heating-and-pressing device 6, the one and the other resin films 54 and 54 are heated by radiation by the pair of the resin film heating devices 11a and 11b, respectively, from the sides of the aggregate-side film surfaces 54a and 54a of the one and the other resin films 54 and 54 (preliminary film heating process). In this way, the aggregate-side film surfaces 54a and 54a of the one and the other resin films 54 and 54 are melted.

The aggregate 40 which is sent out from the aggregate send-out device 2 and the resin films 54 and 54 both of which are sent out from the pair of the protection film peel-off mechanisms 4 and 4, respectively, enter into between the pair of the heating and compression rollers 6 in such a way that the aggregate 40 having the front surface 40a and the back surface 40b thereof heated, the aggregate 40 having been sent out from the aggregate send-out device 2, may be laminated with the resin films 54 and 54 having the aggregate-side film surfaces 54a and 54b thereof melted. Further, under a normal pressure, each of the aggregate-side film surfaces 54a and 54a of the pair of the resin films 54 and 54 is press-adhered to the aggregate 40 having the front surface 40a and the back surface 40b thereof heated, by means of the sheet-heating-and-pressing device 6 to obtain the FRP precursor 60 (film press-adhering process). At this time, by controlling the temperatures of the heating bodies that are present inside the pair of the heating and compression rollers, compression with heating is conducted with keeping the temperatures of the pair of the heating and compression rollers at prescribed temperatures in the film press-adhering process.

At the time when the thermosetting resin is adhered to the aggregate by heating and pressing, the temperature of the heating and compression roller is preferably in the range of minus 40° C. to plus 20° C. relative to a minimum melt viscosity temperature obtained by measurement of a thermosetting resin composition by means of a rheometer. The pressure to be applied may be any linear pressure; the heating and pressing is conducted with a roll-lamination in accordance with the test method described in No. 2.3.17.1 of IPC-TM-650, wherein it is preferable that the seepage of the 1.6-mm punch hole is 50 µm or more and the seepage of the 6.4-mm punch hole is 1200 µm or less, while it is more preferable that the seepage of the 1.6-mm punch hole is 100 µm or more and the seepage of the 6.4-mm punch hole is 500 µm or less.

The minimum melt viscosity temperature of the thermosetting resin composition is, in view of productivity of the FRP precursor, preferably in the range of 60 to 150° C., more preferably in the range of 80 to 140° C., while still more preferably in the range of 100 to 130° C.

In the film press-adhering process, the resin film 54 is adhered to the aggregate 40 under an atmosphere, where a good workability is prevailing. At this time, the resin film 54 is melted and flowed not by heating the aggregate-side film surface 54a over a carrier film by means of the heating and compression roller of the sheet heating-and-pressing device 6 but by heating the resin film 54 from its adhering side to the aggregate 40, or alternatively the aggregate 40 is heated in advance. By so doing, the temperature of the melted resin is not lowered in the front surface 40a and the back surface 40b of the aggregate 40, so that not only impregnation of the resin can be improved due to the decrease in the viscosity by heating, but also the decrease in the viscosity of the resin portion not relating to filling to the aggregate 40, which is caused by excessive heating from the heating and pressing roll of the sheet heating-and-pressing device 6, can be suppressed, thereby enabling filling of the resin into a bulk gap of the aggregate 40 as well as preventing the resin from spouting out from an edge portion thereof, so that the productivity of the FRP precursor 60 can be enhanced.

The FRP precursor 60 which is sent out from the sheet heating-and-pressing device 6 is pressed further and cooled by the sheet pressing-and-cooling device 7.

The FRP precursor 60 which is sent out from the sheet pressing-and-cooling device 7 is rolled up by the FRP precursor roll-up device 8.

The FRP precursor produced by the FRP precursor production device 1 will be explained.

Illustrative example of the aggregate of the FRP precursor to be produced includes a woven cloth and a unwoven cloth that are obtained by using single body of or a mixture of inorganic fiber substrates such as glass and carbon, organic fiber substrates such as aramid and cellulose, and metal fiber substrates such as iron, copper, aluminum, and alloys of these metals.

The thermosetting resin film to be used in the production method of the present invention is a film which includes a thermosetting resin and is in a form of a film made of a composition including a thermosetting resin (hereinafter, this is also referred to as "thermosetting resin composition").

Illustrative example of the thermosetting resin includes a phenol resin, a urea resin, a furan resin, and an epoxy resin. Especially, in view of workability, handling properties, and price, an epoxy resin is preferable.

As to the epoxy resin, epoxy resins having two or more functionalities are preferable. Illustrative example of the epoxy resin having two or more functionalities includes bisphenol-based epoxy resins such as a bisphenol-A-based epoxy resin, a bisphenol-F-based epoxy resin, and a bisphenol-AD-based epoxy resin; alicyclic epoxy resins; novolak-based epoxy resins such as a phenol novolak-based epoxy resin, a cresol novolak-based epoxy resin, a bisphenol-A novolak-based epoxy resin, and an aralkyl novolak-based epoxy resin; diglycidyl ether compounds of polyfunctional phenols; and hydrogenated products of these compounds. These epoxy resins may be used singly, or two or more of them may be used concurrently.

If flame retardance is required, a halogenated epoxy resin may be blended thereto. In addition, in order to satisfy the flame retardance without addition of the halogenated epoxy resin, compounds generally called as a flame retardant or a flame retardant auxiliary, such as tetrabromobisphenol-A, decabromodiphenyl ether, antimony oxide, tetraphenyl phosphine, organic phosphorous compounds, and zinc oxide, may be added thereto.

When the epoxy resin is used as the thermosetting resin, an epoxy resin curing agent may be used.

Illustrative example of the epoxy resin curing agent includes a phenol resin, an amine compound, an acid anhydride, a boron trifluoride monoethylamine, an isocyanate, a dicyan diamide, and a urea resin.

Illustrative example of the phenol resin includes novolak-based phenol resins such as a phenol novolak resin and a cresol novolak resin; a naphthalene-based phenol resin, a high-ortho-based novolak phenol resin, a terpene-modified phenol resin, a terpene phenol-modified phenol resin, an aralkyl-based phenol resin, a dicyclopentadiene-based phenol resin, a salicylaldehyde-based phenol resin, and a benzaldehyde-based phenol resin. Among them, a phenol novolak resin, a cresol novolak resin, and a partially modified aminotriazine novolak resin are preferable.

Illustrative example of the amine compound includes aliphatic amines such as triethylene tetramine, tetraethylene pentamine, and diethylamino propylamine; and aromatic amines such as meta-phenylene diamine and 4,4'-diamino diphenyl methane.

Illustrative example of the acid anhydride includes phthalic anhydride, methyltetrahydrophthalic anhydride, tetrahydrophthalic anhydride, and hexahydrophthalic anhydride. These epoxy resin curing agents may be used singly, or two or more of them may be used concurrently.

Amount of the epoxy resin curing agent to be blended is preferably in the range of 0.3 to 1.5 equivalents as the equivalent ratio of the curing agent's reactive group relative to 1 epoxy equivalent of the epoxy resin. When the blended amount of the epoxy resin curing agent is within the above-mentioned range, the cure degree can be readily controlled, so that the productivity can be enhanced.

The thermosetting resin composition may further contain a curing accelerator.

Illustrative example of the curing accelerator includes an imidazole compound, an organic phosphorous compound, a tertiary amine, and a quaternary amine salt. The imidazole compound may be an imidazole compound having latency by masking an imidazole's secondary amino group with acrylonitrile, isocyanate, melamine, acrylate, or the like. Illustrative example of the imidazole compound to be used here includes imidazole, 2-methyl imidazole, 4-ethyl-2-methyl imidazole, 2-phenyl imidazole, 2-undecyl imidazole, 1-benzyl-2-methyl imidazole, 2-heptadecyl imidazole, 4,5-diphenyl imidazole, 2-methyl imidazoline, 2-ethyl-4-methyl imidazoline, 2-undecyl imidazoline, and 2-phenyl-4-methyl imidazoline.

In addition, a photoinitiator which initiates curing by generating a radical, an anion, or a cation by photodegradation may be used as well.

These curing accelerators may be used singly, or two or more of them may be used concurrently.

Amount of the curing accelerator to be blended is preferably in the range of 0.01 to 20 parts by mass relative to 100 parts by mass of the epoxy resin. When the amount thereof is 0.01 or more parts by mass, a sufficient curing acceleration effect can be obtained, and when the amount thereof is 20 or less parts by mass, the thermosetting resin composition is excellent not only in storage stability and physical properties of the cured product but also in economy.

The thermosetting resin composition may further contain a filler in order to improve non-transmitting property and abrasion resistance as well as to increase the amount thereof.

Illustrative example of the filler includes oxides such as silica, aluminum oxide, zirconia, mullite, and magnesia; hydroxides such as aluminum hydroxide, magnesium hydroxide, and hydrotalcite; nitride ceramics such as aluminum nitride, silicon nitride, and boron nitride; natural minerals such as talc, montmorillonite, and saponite; and metal particles and carbon particles.

As compared with the resin, these fillers have wider specific gravities from low to high; thus, the amount of the filler is preferably counted not with parts by mass but with a volume rate.

Amount of the filler to be added is significantly different in accordance with the purpose of the addition thereof; however, the amount thereof is preferably in the range of 0.1 to 65% by volume in the volume of the solid portion of the thermosetting resin composition. When the amount thereof is 0.1% or more by volume, if the addition thereof is made with the purposes for coloring and obtaining a non-transmitting property, sufficient effects can be expressed. When the amount thereof is 65% or less by volume, not only a viscosity of the composition can be suppressed but also the amount thereof can be increased without deteriorating workability and adhesion property.

It must be noted here that the solid portion in this specification means the components other than volatile substances such as water and an organic solvent to be mentioned later in the composition. Namely, the solid portion includes those that are, at room temperature around 25° C., in a liquid state, a syrup state, and a waxy state; and therefore, this does not necessarily mean it is in a solid state.

As necessary, even compounds other than the above-mentioned compounds may be mixed so far as the effects of the present invention are not damaged. For example, in order to impart the cured resin with a resin tackiness and to enhance the adhesiveness upon adhesion, a flexible material may be added thereto.

Illustrative example of the flexible material includes polystyrene, polyolefin, polyurethane, acryl resin, acrylonitrile rubber, polyvinyl alcohol, substances modified with an epoxy group or a carboxy group so as to incorporate these compounds into a curing system, and a phenoxy that is previously made to a macromolecule by reacting with an epoxy resin. These flexible materials may be used singly, or two or more of them may be used concurrently.

Amount of the flexible material to be blended is preferably in the range of 3 to 200 parts by mass relative to the solid portion of the thermosetting resin composition. When the amount thereof is 3 or more parts by mass, the flexibility can be imparted sufficiently well; when the amount thereof is 200 or less parts by mass, the modulus of the cured product can be kept well. However, if a decrease of the modulus does not give an impact to an intended specification, the upper limit value thereof may be arbitrarily determined in accordance with the purpose without being bound by the above-mentioned range.

In order to make the thermosetting resin composition uniform, it is preferable to make the thermosetting resin composition a varnish state by dissolving and/or dispersing it in an organic solvent.

Illustrative example of the organic solvent includes acetone, methyl ethyl ketone, toluene, xylene, cyclohexanone, 4-methyl-2-pentanone, ethyl acetate, ethylene glycol monoethyl ether, dipropylene glycol monomethyl ether, dipropylene glycol monoethyl ether, tripropylene glycol monomethyl ether, N,N-dimethyl formamide, and N,N-dimethyl acetamide. These organic solvents may be used singly, or two or more of them may be used concurrently. If there is no problem in the property thereof, powder mixing in which the afore-mentioned materials are mixed in a powder state may be conducted, or the composition may be made to an aqueous solution by suspending it. Further alternatively, homogenization of the thermosetting resin composition may be conducted by direct stirring of it at the temperature in which curing of the thermosetting resin composition does not take place eminently as well as under the temperature in which the thermosetting resin composition is in a liquid state.

In order to increase in dispersibility of the filler and in adhesiveness to the aggregate or to an objective substance, a coupling agent may be added thereto. Illustrative example of the coupling agent includes silane coupling agents containing a vinyl group, such as vinyl trichlorosilane and vinyl triethoxy silane; silane coupling agents containing an epoxy group, such as 3-glycidoxypropyl trimethoxy silane and 2-(3,4-epoxycyclohexyl)ethyl trimethoxy silane; silane coupling agents containing an amino group, such as 3-aminopropyl trimethoxy silane and N-2-(aminoethyl)-3-aminopropyl triethoxy silane; and titanate-based coupling agents. These coupling agents may be used singly, or two or more of them may be used concurrently.

Amount of the coupling agent to be added is preferably in the range of 0.01 to 5 parts by mass relative to the solid portion of the thermosetting resin composition. When the amount thereof is 0.01 or more parts by mass, the surface of the aggregate as well as the surface of the filler can be satisfactorily covered; when the amount thereof is 5 or less parts by mass, the event of excessive coupling agent can be suppressed.

Next, the thermosetting resin composition obtained by the blending mentioned above is applied onto a carrier film; and after unnecessary organic solvent is removed, the thermosetting resin composition is thermally cured to obtain a film of the said resin composition. Meanwhile, the thermal cure at this time is conducted with a purpose to make the thermosetting resin composition a so-called semi-cured state (B stage), wherein it is preferable to make the thermosetting resin composition semi-cured so as to give the viscosity thereof suitable in lamination workability.

Illustrative example of the carrier film includes films of organic substances such as polyethylene terephthalate (PET), biaxially oriented polypropylene (OPP), polyethylene, polyvinyl fluoride, and polyimide; films of copper and aluminum, as well as alloy films of these metals; and these organic films or metal films whose surfaces are subjected to a release treatment by a release agent.

The workability is favorable if after the thermosetting resin composition is applied to the carrier film and then semi-cured, the carrier film is laminated to this surface so as to sandwich the thermosetting resin composition, and then this is rolled up.

At the time when the thermosetting resin film is laminated to the aggregate, the thickness of the thermosetting resin film to be used is arbitrary, wherein in the case that the thermosetting resin film having a thinner thickness than that of the aggregate is used, the aggregate that has been laminated with the thermosetting resin film may be laminated again with the thermosetting resin film.

When a plurality of the thermosetting resin films are used, the thermosetting resin films having different curing degrees, compositions, or the like may be used as a combination of them.

At the time when the FRP precursor having the thermosetting resin film laminated to the aggregate is obtained, it is also allowed that this is cut to an arbitrary size, followed by adhering the cut piece to a prescribed substance with conducting the thermal cure. This may also be used in the roll to roll process.

EXAMPLES

The present invention will be explained in more detail by Examples described below; however, these Examples do not limit the present invention.

[Production of the FRP Precursor]

Example 1

To 100 parts by mass of a phenol novolak-based epoxy resin (N-660, manufactured by DIC Corp.) and 60 parts by mass of a cresol novolak resin (KA-1165, manufactured by DIC Corp.) were added 15 parts by mass of cyclohexane and 130 parts by mass of methyl ethyl ketone, and the resulting mixture was stirred well for dissolution. To this were added 180 parts by mass of aluminum hydroxide (CL-303, manufactured by Sumitomo Chemical Co., Ltd.) as the filler, 1 part by mass of a coupling agent (A-187, manufactured by Momentive Performance Materials, Inc.), and 2.5 parts by mass of an isocyanate-masked imidazole (G8009L. manufactured by DKS Co., Ltd.); and the resulting mixture was stirred for dissolution and dispersion to obtain a thermosetting resin varnish A with the nonvolatile fraction of 70% by mass.

This thermosetting resin varnish A thus obtained was applied to a PET film (G-2, manufactured by Teijin DuPont Films Japan Ltd.) having the width of 580 mm so as to give the application width of 525 mm with the thickness after drying being 20 μm to prepare a thermosetting resin film A.

When a minimum melt viscosity temperature of the thermosetting resin film A thus prepared was measured by using a rheometer (AR-200ex with a jig of 20 mmφ, manufactured by TA Instruments Japan Inc.) with the temperature raising rate of 3° C./minute, the minimum melt viscosity temperature thereof was 128° C.

Next, a glass woven cloth (weight: 48 g/m$^2$, IPC #1080, substrate width: 530 mm, manufactured by Nitto Boseki Co., Ltd.) as the aggregate, warmed in advance, was sandwiched from its both sides by the thermosetting resin films A warmed in advance, and the aggregate thus sandwiched was inserted into a heating and pressing roll so as to carry out the press-impregnation thereof with the thermosetting resin; and then, it was cooled by a cooling roll and then rolled up to prepare the FRP precursor A.

As the press-roll condition in lamination, the roll temperature of 100° C., the linear pressure of 0.2 MPa, and the rate of 2.0 m/minute were employed.

Heating of the aggregate-side film surface of the thermosetting resin film A (preliminary film heating process) was conducted by using a halogen heater (UH-USF-CL-700, manufactured by Ushio Inc.). The heating position was set such that the heating surface center of the halogen heater might be positioned 30 mm before the press roll and the heating temperature was set such that the surface temperature at the heating surface center might be 135° C.

Heating of the aggregate's surface (aggregate's surface heating process) was also conducted by using the same halogen heater as the above-mentioned halogen heater, and the process was controlled such that the aggregate's surface temperature might be 140° C.

Example 2

The thermosetting resin varnish A of Example 1 was applied to a PET film having the width of 580 mm so as to give the application width of 525 mm with the thickness after drying being 50 μm to prepare a thermosetting resin film B. The minimum melt viscosity temperature of the thermosetting resin film B measured with the same condition as Example 1 was 122° C.

Next, the same procedure as Example 1 was followed, except that the thermosetting resin film B was used instead of the thermosetting resin film A in Example 1, to prepare the FRP precursor B.

Example 3

The thermosetting resin varnish A of Example 1 was applied to a PET film having the width of 580 mm so as to give the application width of 525 mm with the thickness after drying being 80 μm to prepare a thermosetting resin film C. The minimum melt viscosity temperature of the thermosetting resin film C measured with the same condition as Example 1 was 117° C.

Next, the same procedure as Example 1 was followed, except that a glass woven cloth (weight: 209 g/m$^2$, IPC #7628, substrate width: 530 mm, manufactured by Nitto Boseki Co., Ltd.) was used as the aggregate and the thermosetting resin film C was used instead of the thermosetting resin film A, to prepare the FRP precursor C.

Example 4

The thermosetting resin varnish A of Example 1 was applied to a PET film having the width of 580 mm so as to give the application width of 525 mm with the thickness after drying being 40 μm to prepare a thermosetting resin film D. The minimum melt viscosity temperature of the thermosetting resin film D measured with the same condition as Example 1 was 108° C.

Next, an aramid paper (Nomex 411; official thickness: 0.18 mm, weight: 175 g/m$^2$, manufactured by DuPont Teijin Advanced Papers Ltd.) as the aggregate, warmed in advance, was sandwiched from its both sides with the thermosetting resin films D warmed in advance, and the aggregate thus sandwiched was inserted into a heating and pressing roll so as to carry out the press-impregnation thereof with the thermosetting resin; and then, it was cooled by a cooling roll and then rolled up to prepare the FRP precursor D.

As the press-roll condition in lamination, the roll temperature of 80° C., the linear pressure of 0.2 MPa, and the rate of 2.0 m/minute were employed.

Heating of the aggregate-side film surface of the thermosetting resin film D (preliminary film heating process) was conducted by using the same halogen heater as Example 1. The heating position was set such that the heating surface center of the halogen heater might be positioned 50 mm before the press roll and the heating temperature was set such that the surface temperature at the heating surface center might be 120° C.

Heating of the aggregate's surface (aggregate's surface heating process) was also conducted by using the same halogen heater as the above-mentioned halogen heater, and the process was controlled such that the aggregate's surface temperature might be 140° C.

Comparative Example 1

The thermosetting resin film A was prepared in the same way as Example 1, and two films thereof were laminated on both surfaces of a glass woven cloth (weight: 48 g/m$^2$, IPC #1080, substrate width: 530 mm, manufactured by Nitto Boseki Co., Ltd.) as the aggregate. Heating of the thermosetting resin film A and heating of the aggregate before lamination were not conducted. As the press-roll condition in lamination, the roll temperature of 100° C., the linear pressure of 0.2 MPa, and the rate of 2.0 m/minute were employed.

Comparative Example 2

The thermosetting resin film A was prepared in the same way as Example 1, and two films thereof were laminated on both surfaces of a glass woven cloth (weight: 48 g/m$^2$, IPC #1080, substrate width: 530 mm, manufactured by Nitto Boseki Co., Ltd.) as the aggregate. Heating of the thermosetting resin film A and heating of the aggregate before lamination were not conducted. As the press-roll condition in lamination, the roll temperature of 150° C., the linear pressure of 0.3 MPa, and the rate of 1.5 m/minute were employed.

Comparative Example 3

The thermosetting resin varnish A of Example 1 was prepared; and after the thermosetting resin varnish A was applied to a glass woven cloth (weight: 48 g/m$^2$, IPC #1080, manufactured by Nitto Boseki Co., Ltd.) as the aggregate by a coating machine, drying was carried out to remove the solvent with conducting the thermal cure. Control of the application weight was conducted by a squeeze roll method, and the coating was carried out with the target of the attached resin amount being equal to that in Example 2.

Comparative Example 4

The thermosetting resin film C was prepared in the same way as Example 3, and two films thereof were laminated on both surfaces of a glass woven cloth (weight: 209 g/m$^2$, IPC #7628, manufactured by Nitto Boseki Co., Ltd.) as the aggregate. Heating of the thermosetting resin film C and heating of the aggregate before lamination were not conducted. As the press-roll condition in lamination, the roll temperature of 150° C., the linear pressure of 0.3 MPa, and the rate of 1.2 m/minute were employed.

[Evaluation Methods]

The FRP precursors obtained in Examples and Comparative Examples were evaluated with regard to the following items. These results are summarized in Table 1.

(1) Variance in the Thickness

With regard to each of the FRP precursors obtained in respective examples, thicknesses of total 11 spots which are located in every 50 mm in the width direction from the center of the width direction and thicknesses of total 10 spots which are located in every 50 mm in the longitudinal direction and each of which is started from the foregoing 11 spots (namely, 11×10=110 spots) were measured with the accuracy of 0.001 mm by using a upright gauge, wherein a difference between the maximum value and the minimum value thereof was regarded as the variance in the thickness.

(2) Resin Seepage from the Edge Portion

The resin seepage from the edge portion was measured with the test method according to IPC-TM-650 No. 2.3.17.1.

(3) Impregnability to the Aggregate

After the FRP precursor was cooled by a liquid nitrogen, it was cut. And after the temperature thereof was resumed to room temperature (25° C.), the cut surface thereof was observed with an optical microscope to evaluate in accordance with the following standards.

A: Existence of the unfilled portion was not recognized.
B: Existence of the unfilled portion was recognized.

TABLE 1

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
| Content of resin composition in FRP precursor* | % by mass | 59 | 78 | 56 | 52 | 59 | 59 | 74 | 56 |
| (1) Variance in thickness | μm | ±2 | ±3.6 | ±0.21 | ±3.3 | ±1.6 | ±5.8 | Upper application limit: Resin is about to drop on the surface. | ±5.6 |
| (2) Resin seepage from the edge portion | mm | 0.4 | 1.2 | 1.1 | 0.8 | 0.6 | 3.5 | | 4.3 |
| (3) Impregnability to aggregate | — | A | A | A | A | B | A | | B |

*Content of resin composition includes amount of the filler.

From Table 1, it can be clearly seen that the FRP precursors obtained by the production method of the present invention are excellent in filling of the resin into a bulk gap of the aggregate and can prevent the resin from spouting out from the edge portion thereof.

REFERENCE SIGNS LIST

1 FRP precursor production device
2 Aggregate send-out device
3 Resin film send-out device
4 Protection film peel-off mechanism
5 Protection film roll-up device
6 Sheet heating-and-pressing device (film press adhering means)
7 Sheet pressing-and-cooling device
8 FRP precursor roll-up device
10 Aggregate heating device (aggregate's surface heating means)
11a, 11b Resin film heating device
40 Aggregate
40a Aggregate's front surface (one aggregate's surface; one surface of both aggregate's surfaces)
40b Aggregate's back surface (another aggregate's surface; another surface of both aggregate's surfaces)
50 Protection-film-attached resin film
52 Protection film
54 Resin film (film)
54a Aggregate-side resin film surface (aggregate-side film surface)
60 FRP precursor

The invention claimed is:

1. A method for producing an FRP precursor, wherein the method is to produce the FRP precursor by melt-adhering a thermosetting resin film to one surface of an aggregate that is in a form of sheet, the method comprising:
   an aggregate's surface heating process to heat one surface of the aggregate, and then
   a film press-adhering process to obtain the FRP precursor wherein under a normal pressure, of both surfaces of the film, an aggregate-side film surface, which is a surface in an aggregate side thereof, is press-adhered to an aggregate's surface, which is one surface of the heated aggregate.

2. The method for producing the FRP precursor according to claim 1, wherein the film press-adhering process is a process to press-adhere the film to the aggregate with heating the film and the aggregate, and a heating temperature of one surface of the aggregate in the aggregate's surface heating process is higher than a heating temperature in the film press-adhering process by 5 to 70° C.

3. The method for producing the FRP precursor according to claim 1, wherein the method further comprises a preliminary film heating process to heat the aggregate-side film surface by radiation from a side of the aggregate-side film surface.

4. The method for producing the FRP precursor according to claim 3, wherein the film press-adhering process is a process to press-adhere the film to the aggregate with heating the film and the aggregate, and a heating temperature of the aggregate-side film surface in the preliminary film heating process is higher than a heating temperature in the film press-adhering process by 5 to 70° C.

5. The method for producing the FRP precursor according to claim 1, wherein the film press-adhering process is conducted in the range of minus 40° C. to plus 20° C. relative to a minimum melt viscosity temperature of the thermosetting resin film.

6. A method for producing an FRP precursor, wherein the method is to produce the FRP precursor by melt-adhering each of a pair of thermosetting resin films to each of both surfaces of an aggregate that is in a form of a sheet, the method comprising:
   an aggregate's surface heating process to heat both aggregate's surfaces, which are both surfaces of the aggregate, and then
   a film press-adhering process to obtain the FRP precursor wherein under a normal pressure, of both surfaces of one film of the pair of the films, one aggregate-side film surface, which is a surface in an aggregate side thereof, is press-adhered to one surface of the heated both aggregate's surfaces, and of both surfaces of another film of the pair of the films, an another aggregate-side film surface, which is a surface in an aggregate side thereof, is press-adhered to another surface of the heated both aggregate's surfaces.

7. The method for producing the FRP precursor according to claim 6, wherein the film press-adhering process is a process to press-adhere the pair of the films and the aggregate with heating the pair of the films and the aggregate, and a heating temperature of both surfaces of the aggregate in the aggregate's surface heating process is higher than a heating temperature in the film press-adhering process by 5 to 70° C.

8. The method for producing the FRP precursor according to claim 7, wherein the method further comprises a preliminary film heating process to heat one aggregate-side film surface by radiation from a side of the one aggregate-side film surface, and to heat another aggregate-side film surface by radiation from a side of the another aggregate-side film surface.

9. The method for producing the FRP precursor according to claim 8, wherein the film press-adhering process is a process to press-adhere the pair of the films to the aggregate with heating the films and the aggregate, and each of heating temperatures of the one aggregate-side film surface and the another aggregate-side film surface in the preliminary film heating process is higher than a heating temperature in the film press-adhering process by 5 to 70° C.

10. The method for producing the FRP precursor according to claim 6, wherein the film press-adhering process is conducted in the range of minus 40° C. to plus 20° C. relative to a minimum melt viscosity temperature of the thermosetting resin film.

* * * * *